United States Patent
Bilandzic et al.

(10) Patent No.: US 6,887,454 B1
(45) Date of Patent: May 3, 2005

(54) PROCESS FOR THE PRODUCTION OF ALUMINIUM HYDROXIDE

(75) Inventors: Genoveva Bilandzic, Cologne (DE); Neil Brown, Bergheim (DE); Norbert Putz, Bergheim (DE)

(73) Assignee: Albemarle Corporation, Baton Rouge, LA (US)

( * ) Notice: Subject to any disclaimer, the term of this patent is extended or adjusted under 35 U.S.C. 154(b) by 337 days.

(21) Appl. No.: 10/019,022

(22) PCT Filed: Jun. 27, 2000

(86) PCT No.: PCT/EP00/05980

§ 371 (c)(1),
(2), (4) Date: Jun. 12, 2002

(87) PCT Pub. No.: WO01/00529

PCT Pub. Date: Jan. 4, 2001

(30) Foreign Application Priority Data

Jun. 29, 1999 (EP) ............................... 99112401

(51) Int. Cl.$^7$ .................................................. C01F 7/34
(52) U.S. Cl. ...................... 423/629; 423/127; 524/437
(58) Field of Search .................. 423/127, 629; 524/437

(56) References Cited

U.S. PATENT DOCUMENTS

| 4,847,064 A | | 7/1989 | Pearson |
| 5,492,542 A | * | 2/1996 | Brown et al. ............. 23/305 A |
| 5,500,480 A | * | 3/1996 | Brown et al. ............... 524/437 |

FOREIGN PATENT DOCUMENTS

| EP | 0589432 | 3/1994 |
| JP | 9176367 | 7/1997 |

OTHER PUBLICATIONS

Gerson et al, "Influence of solution constituents, solution conditioning and seeding in the crystalline phase of aluminum hydroxide using in situ X–ray diffraction", *Journal. Of Crystal Growth*, vol. 160, No. 3,4, 1996, pp. 346–354.

Stapathy et al., "Development of Special Grade Hydrate and Alumina", *Proceedings of the TMS Annual Meeting*, US, Warrendale, TMS, vol. Meeting 123, pp. 147–153.

* cited by examiner

Primary Examiner—Stanley S. Silverman
Assistant Examiner—Maribel Medina
(74) Attorney, Agent, or Firm—Jeffrey S. Melcher; Manelli Denison & Selter, PLLC

(57) ABSTRACT

Gibbsite type aluminium hydroxides are obtained by seeding a Bayer liquor with bayerite crystals. The gibbsite type aluminium hydroxide show excellent properties as fire retardant fillers in synthetic resins.

9 Claims, No Drawings

PROCESS FOR THE PRODUCTION OF ALUMINIUM HYDROXIDE

The invention relates to a process for the production of aluminium hydroxide.

Aluminium hydroxide is widely used as fire retardant filler in glass reinforced plastic composite materials, the fire safety of which is an issue of increasing importance.

In order to meet the increasingly stringent fire safety requirements, it is important to be able to raise the filling level of aluminium hydroxide to ever higher values without compromising the physical properties of the resulting composite material.

It is well-known in the art that increased filling levels can be achieved by mixing aluminium hydroxides having different particle size distributions in order to obtain a more densely packed dispersion in synthetic resin (Rai et al. *Inorganic Flame Retardants—Alone and in combinations, Presentation at Flame Retardants* 98, February 1998, London). In general, the wider the resulting particle size distribution (psd), the lower the viscosity and, hence, the better the workability of the dispersion. However, the limitations here are that coarser particles of aluminium hydroxide will result in poorer surface quality of the finished part and degradation of mechanical properties.

The challenge to the industry is to achieve high filling levels at finer particle sizes. In addition, it is particle size and particle shape which combine to give the best possible packing so that only by exploiting the latter optimum results can be obtained.

The problem here is that the finest particles themselves are limited in terms of complexity of particle shape adopted during crystallisation. The alternative is grinding to very fine particle sizes, but this also has limited use because the crystallinity of the material is decreased and high energy surfaces are formed which create additional problems of high moisture content and interference with the chemistry of synthetic resins and their curing mechanisms.

Three forms of aluminium hydroxide are known: gibbsite ($\alpha$-aluminum hydroxide), bayerite ($\beta$-aluminium hydroxide) and nordstrandite (K. Wefers and C. Misra *Oxides and Hydroxides of Aluminium*; Alcoa Technical Paper No. 19, Revised: 1987). Of these, gibbsite is the best known and occurs in nature as the principal constituent of bauxite. Synthetic gibbsite is an intermediate of the Bayer process for the production of alumina from bauxite. It is prepared by seeding supersaturated sodium aluminate solution with previously formed gibbsite crystals.

Bayerite does not occur in nature but it can be made in various ways, e.g., by treating sodium aluminate solution with carbon dioxide at about 20° C. However, a key property of bayerite is its transformation to the more thermodynamically stable phase, gibbsite, on prolonged holding under such strongly alkaline conditions (K. Wefers and C. Misra *loc. cit.*)

Nordstrandite rarely occurs naturally, but can be obtained synthetically from gelatinous hydroxide by ageing in the presence of a chelating agent such as ethylene diamine, ethylene glycol or EDTA.

Of the three forms of aluminium hydroxide, gibbsite is technically the most important. It is the preferred form used by the plastics industry to impart fire retardant properties to composite materials.

The crystallisation of aluminium hydroxide by the Bayer process is well-known in the art. This aluminium hydroxide however is destined for calcination to alumina and subsequent smelting to aluminium metal. Its coarse particles are not suitable for use as a flame retardant in plastics.

At the other end of the particle size spectrum are the fine crystals which are generally produced in a side stream process in which the crystallisation conditions are altered to create new crystals by a secondary nucleation mechanism, i.e., the seed crystals are very fine and specially prepared to be active in generating new nuclei.

The large gap in the middle of the particle size spectrum, comprising a particle size of about 4 to 20 $\mu$m, is normally covered via size reduction of the very large particles obtained in the crystallisation step of the Bayer process. Thereafter, mixtures of differing psd can be produced by mixing to achieve improved packing characteristics which lead to lower viscosities in synthetic resins, and hence higher obtainable filling levels. However, grinding to an average particle size of less than 0.5 $\mu$m increasingly creates only crystalline debris with distorted surfaces.

A difficulty limiting the use of very fine crystals is their pronounced tendency to aggregate and agglomerate during crystallisation. These effects are deleterious to good rheology in synthetic resins since they can increase viscosity levels dramatically. When mixed with coarser crystals to broaden the psd, they cannot be incorporated at levels which can exploit their fireproofing properties.

The object of the present invention therefore is to provide a process for the production of a fine crystalline aluminium hydroxide which does not give rise to the drawbacks outlined above and known from prior art.

This object could be achieved by the process of claim 1, the gibbsite type aluminium hydroxide obtained by said process according to claim 7, and the synthetic resin filled with the respective aluminium hydroxide according to claim 8.

Surprisingly, it has been found that during particle size enlargement via crystal growth gibbsite crystals nucleated by bayerite seed retain their characteristic platy pseudo-hexagonal crystal habit much longer than do fine crystals nucleated by gibbsite (highly active, finely ground seed).

Also standard crystallisation measures taken to further increase the size of the crystals, e.g., raising the temperature and/or reducing the seed charge increase the size of the crystals with surprisingly little aggregation and/or agglomeration, which is the normal occurrence with gibbsite crystals.

The process of the present invention is characterised in that a liquor obtained from the Bayer process is seeded with bayerite crystals and subsequently stirred under precipitation of the gibbsite type aluminium hydroxide. Thereafter the solid obtained in suspension is filtered off.

The liquor from the Bayer process can be defined by a molar ratio of $Na_2O$ to $Al_2O_3$ in the range of 1.4:1 to 1.55:1, preferably from 1.45:1 to 1.50:1.

The bayerite crystals used as seed expediently have a grain diameter in the 50% range ($d_{50}$) of 1.2 $\mu$m to 2.2 $\mu$m, preferably of 1.5 $\mu$m to 1.8 $\mu$m. They can further be characterised by a grain diameter in the 10% range ($d_{10}$) of 0.5 $\mu$m to 0.9 $\mu$m, preferably 0.6 $\mu$m to 0.8 $\mu$m, and a grain diameter in the 90% range ($d_{90}$) of 3.5 $\mu$m to 5.5 $\mu$m, preferably 4.0 $\mu$m to 4.5 $\mu$m.

The bayerite crystals used for the process according to the invention may be obtained by seeding a pregnant (supersaturated) Bayer liquor having a molar ratio of $Na_2O$ to $Al_2O_3$ as given above and having been cooled to a temperature of 20° C. to 25° C. with 2 g/l to 3 g/l of bayerite crystals previously obtained.

The resulting suspension as a rule will be stirred for a period of 15 to 25 hours, but at least until the solid content has risen to 60 g/l to 120 g/l.

The crystals in this suspension have an average particle size of 5 to 15 μm and a specific surface area (according to BET) of 5 to 10 m²/g.

After filtering, washing the crystals with water and resuspending them in water, the suspension undergoes a size reduction treatment to lower the average crystal size to less than 1 μm and to raise the specific surface area (BET) to more than 20 m²/g.

The size reduction treatment may be brought about in mills customarily employed for this kind of milling, e.g., bead mills.

The crystals obtained are characterised as described above.

Seeding as a rule is effected by adding the bayerite crystals obtained to the Bayer liquor at a temperature of 50° C. to 70° C. and in an amount (relating to the Bayer liquor) of 1 g/l to 3 g/l.

During crystallisation the bayerite seed is fully transformed to gibbsite.

Precipitation usually takes place under stirring and will be continued until the molar ratio of $Na_2O$ to $Al_2O_3$, is in the range of 2.2:1 to 3.5:1, preferably from 2.5:1 to 3.0:1.

The precipitated gibbsite type aluminium hydroxide can easily be collected by filtration.

The gibbsite type crystalline aluminium hydroxide prepared by the process of the present invention typically has the following characteristics:

A grain diameter in the 50% range ($d_{50}$) of 1.5 μm to 4.5 μm, preferably 1.8 μm to 4.0 μm, in the 10% range ($d_{10}$) of 0.4 μm to 2.0 μm, preferably 0.5 μm to 1.8 μm, and in the 90% range ($d_{90}$) of 3.0 μm to 9.5 μm, preferably 3.5 μm to 9.0 μM.

A specific surface area (BET) in the range of 1.0 m²/g to 4.0 m²/g, preferably 2.0 m²/g to 3.0 m²/g.

An aspect ratio (i.e., the ratio length:thickness) of a crystal of about 4:1 to 6:1.

The crystalline gibbsite type aluminium hydroxide obtained by the process of the present invention can—either alone or as part of a mixture—be filled into synthetic resins, preferably into thermosetting plastics, such as unsaturated polyester or epoxy resins.

Extraordinarily high filling levels of 150 phr (parts per hundred parts of resin) to 200 phr can be achieved.

In order to achieve high filling levels at finer particle sizes usually mixtures of aluminium hydroxides having different particle size distributions are applied. The gibbsite type aluminium hydroxide crystals obtained by the process of the invention are ideally suited to be mixed with materials obtained by grinding coarse aluminium hydroxide produced by the Bayer process. On size reduction (grinding), coarse aluminium hydroxides increasingly adopt a plate like form due to cleavage parallel to the basal planes of the blocky hexagonal prisms. Preferably the mixtures have a grain diameter in the 50% range ($d_{50}$) of 4 to 20 μm.

The following non-limiting examples illustrate the invention.

All MARTINAL® types of aluminium hydroxide are commercially available from Alusuisse Martinswerk GmbH, Bergheim/Erft, Germany. The Synolite® resins are products of DSM.BASF Structural Resins. All viscosity measurements were performed at 23° C. in a Brookfield HBT viscosimeter with the spindle and the rotational speed (given in min⁻¹, 1 min₋₁=1 revolution per minute) specified in the column "viscosimeter settings" of the corresponding table.

EXAMPLE 1

A sodium aluminate solution having a temperature of 60° C. and containing 140 g/l of $Na_2O$, 150 g/l of $Al_2O_3$ and 160 g/l of total soda was seeded with 2 g/l of bayerite crystals having the following characteristics:

$d_{50}$=1.6 μm
$d_{10}$=0.75 μm
$d_{90}$=4.25 μm

The bayerite crystals had previously been obtained by seeding a sodium aluminate solution having a temperature of 20 to 22° C. and containing 140 g/l of $Na_2O$, 155 g/l of $Al_2O_3$ and 160 g/l of total soda (molar ratio $Na_2O$ to $Al_2O_3$=1.48) with 2 to 3 g/l of bayerite crystals. The suspension was stirred for 20 hours until the solids content has risen to 100 g/l. The suspended bayerite crystals had a grain diameter in the 50% range ($d_{50}$) of 1.6 μm and a BET surface of 3.4 m²/g. After filtering the suspension, washing the crystals with water and resuspending the crystals in water (concentration ca. 100 g/l), size reduction in a bead mill was accomplished.

Mill parameter:
Mill type: Backofen
Capacity: 200 l
Beads: 1.5 mm diameter
Total Charge: 80%
Throughput: 2000–3000 l/h The crystals thus obtained were filtered off. Their characteristics were as hereinabove described.

After a retention time of 48 hours at 60° C., 100 g/l of gibbsite type aluminium hydroxide was obtained and the bayerite seed was fully transformed to gibbsite during the crystallisation period.

EXAMPLES 2–6

COMPARATIVE EXAMPLES 1–2

The procedure of Example 1 was repeated with various seed charges and crystallization temperatures.

The comparative examples were performed following the same procedure as described above, with the exception that gibbsite was used as seed material.

Table 1 shows the influence of these parameters on the grain diameter in the 50% range ($d_{50}$) of the gibbsite type aluminium hydroxide obtained and the largest particle size present ("top cut") in Examples 1–6 and Comparative Examples 1–2.

TABLE 1

| Example No. | Seed Charge [g/l] | Cryst. Temp. [° C.] | $d_{50}$ [μm] | Top Cut [μm] |
|---|---|---|---|---|
| 1 | 1 | 60 | 2.8 | 7 |
| 2 | 2 | 60 | 1.8 | 6 |
| 3 | 3 | 60 | 1.6 | 6 |
| 4 | 1 | 65 | 3.6 | 8 |
| 5 | 1 | 70 | 4.1 | 9 |
| 6 | 2 | 70 | 3.5 | 8 |
| Comp. 1 | 8 | 60 | 1.4 | 7 |
| Comp .2 | 6 | 60 | 2.1 | 9 |

EXAMPLES 7–8

COMPARATIVE EXAMPLES 3–4

The effect of the different product forms on rheology was tested in synthetic resin. 150 parts per hundred (phr) of the product of Examples 2 and 6 and Comparative Examples 1 and 2 were introduced in the unsaturated polyester resin Synolite® 002-N-2. The results are compiled in Table 2.

TABLE 2

| Example No. | Product source | Viscosity [mPa · s] | Viscosimeter settings |
|---|---|---|---|
| 7 | Ex. 3 | 60 | spindle 3 @ 5 min$^{-1}$ |
| 8 | Ex. 6 | 70 | spindle 4 @ 10 min$^{-1}$ |
| Comp. 3 | Comp. Ex. 1 | 750 | spindle 7 @ 10 min$^{-1}$ |
| Comp. 4 | Comp. Ex. 2 | 1500 | spindle 7 @ 10 min$^{-1}$ |

EXAMPLE 9

COMPARATIVE EXAMPLE 5

Following the procedure of Examples 7–8, rheology in synthetic resin was tested with a mixture of gibbsite type aluminium hydroxide obtained according to Example 2 and coarse size reduced aluminium hydroxide crystals obtained from the Bayer process. Comparison was made against a mixture of the fine gibbsite seeded aluminium hydroxide obtained according to Comparative Example 1 and coarse size reduced aluminium hydroxide crystals obtained from the Bayer process.

175 parts per hundred (phr) of a 1:1 mixture ($d_{50}$=4 μm) of the product of Example 2 or Comparative Example 1 and MARTINAL® ON-310 ($d_{50}$=10 μm) was introduced in the unsaturated polyester resin Synolite® 002-N-2. The results are shown in Table 3.

TABLE 3

| Example No. | Product source | Viscosity [mPa · s] | Viscosimeter settings |
|---|---|---|---|
| 9 | Ex. 2 | 65 | spindle 5 @ 20 min$^{-1}$ |
| Comp. 5 | Comp. Ex. 1 | 220 | spindle 6 @ 10 min$^{-1}$ |

EXAMPLE 10

COMPARATIVE EXAMPLE 6

175 parts per hundred (phr) of a 1:2 mixture ($d_{50}$=14 μm) of the product of Example 6 and MARTINAL® ON-320 ($d_{20}$=20 μm) was introduced in the unsaturated polyester resin Synolite 002-N-2. In Comparative Example 6, the product of Example 6 was replaced with the product of Comparative Example 1

The results are shown in Table 4.

TABLE 4

| Example No. | Product source | Viscosity [mPa · s] | Viscosimeter settings |
|---|---|---|---|
| 10 | Ex. 6 | 28 | spindle 5 @ 50 min$^{-1}$ |
| Comp. 6 | Comp. Ex. 1 | 42 | spindle 3 @ 5 min$^{-1}$ |

EXAMPLE 11

COMPARATIVE EXAMPLE 7

175 parts per hundred (phr) of a 1:1:1 mixture ($d_{50}$=18 μm) of (i) the product of Example 1, (ii) ground grade MARTINAL® ON-320 ($d_{50}$=20 μm) and (iii) unground grade ($d_{50}$=55 μm) MARTINAL® ON was introduced into the Synolite® 002-N-2 unsaturated polyester resin.

The viscosity of this mix was compared with that of another mix in which the product of Example 1 was replaced with the product of Comparative Example 2. The results are given in Table 5.

TABLE 5

| Example No. | Product source | Viscosity [mPa · s] | Viscosimeter settings |
|---|---|---|---|
| 11 | Ex. 1 | 20 | spindle 5 @ 50 min$^{-1}$ |
| Comp. 7 | Comp. Ex. 2 | 29 | spindle 5 @ 50 min$^{-1}$ |

EXAMPLE 12

COMPARATIVE EXAMPLE 8

125 parts per hundred (phr) of a 1:3 mixture ($d_{50}$=16μm) of the product of Example 4 ($d_{50}$=3.6 μm) and the milled grade ($d_{50}$=20 μm) MARTINAL® ON-320 was introduced into the epoxy resin Araldite® GY 260 (Ciba Polymers). The viscosity of this mix was compared with another in which the product of Example 4 was replaced with the product of Comparative Example 2. The results are shown in Table 6.

TABLE 6

| Example No. | Product source | Viscosity [mPa · s] | Viscosimeter settings |
|---|---|---|---|
| 12 | Ex. 4 | 82 | spindle 5 @ 10 min$^{-1}$ |
| Comp. 8 | Comp. Ex. 2 | 140 | spindle 5 @ 10 min$^{-1}$ |

What is claimed is:

1. A process for the preparation of gibbsite type aluminum hydroxides comprising:

seeding a liquor obtained from a Bayer process with bayerite crystals having a grain diameter in the 50% range ($d_{50}$) of 1.2 μm to 2.2 μm.

2. A process according to claim 1, wherein the molar ratio of $Na_2O$ to $Al_2O_3$ in the Bayer liquor is from 1.4:1 to 1.55:1.

3. A process according to claim 1, wherein the bayerite crystals have a grain diameter in the 10% range ($d_{10}$) of 0.5 μm to 0.9 μm and in the 90% range ($d_{90}$) of 3.5 μm to 5.5 μm.

4. A process according to claim 1, wherein the bayerite crystals are added in an amount of 1 g/l to 3 g/l it a liquor temperature of 50° C. to 70° C.

5. A process according to claim 1, wherein after seeding the process mixture is stirred under precipitation until the molar ratio of $Na_2O$ to $Al_2O_3$ is in the range of 2.2:1 to 3.5:1.

6. A gibbsite type aluminium hydroxide having a grain diameter in the 50% range ($d_{50}$) of 1.5 μm to 4.5 μm, in the 10% range ($d_{10}$) of 0.4 μm to 2.0 μm and in the 90% range ($d_{90}$) of 3.0 μm to 9.5 μm, a surface area (according to BET) from 1.0 m$^2$/g to 4.0 m$^2$/g and an aspect ratio from 4:1 to 6:1.

7. A mixture of gibbsite type aluminum hydroxides, wherein the mixture has a grain diameter in the 50% range of ($d_{50}$) 4 to 20 μm and comprises a gibbsite type aluminum hydroxide according to claim 6.

8. A synthetic resin comprising a gibbsite type aluminum hydroxide according to claim 6.

9. The use of a gibbsite type aluminum hydroxide according to claim 6 as a fire retardant additive in synthetic resins.

* * * * *